United States Patent
Nandanavanam et al.

(10) Patent No.: US 10,061,273 B2
(45) Date of Patent: Aug. 28, 2018

(54) INTELLIGENT SECURITY HUB FOR PROVIDING SMART ALERTS

(71) Applicant: Samsung Electronics Co., Ltd., Suwon-si, Gyeonggi-do (KR)

(72) Inventors: Venkata Naga Vamsi Nandanavanam, Fremont, CA (US); Kenny Chui, Campbell, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/346,644

(22) Filed: Nov. 8, 2016

(65) Prior Publication Data

US 2017/0309157 A1    Oct. 26, 2017

Related U.S. Application Data

(60) Provisional application No. 62/327,795, filed on Apr. 26, 2016.

(51) Int. Cl.
| | |
|---|---|
| *G08B 23/00* | (2006.01) |
| *G04G 21/00* | (2010.01) |
| *G04B 19/22* | (2006.01) |
| *G06F 3/0362* | (2013.01) |
| *H04L 29/06* | (2006.01) |
| *H04W 12/06* | (2009.01) |
| *H04W 12/08* | (2009.01) |
| *G08B 25/00* | (2006.01) |
| *H04L 29/08* | (2006.01) |
| *H04W 12/02* | (2009.01) |
| *H04W 4/80* | (2018.01) |

(52) U.S. Cl.
CPC .......... *G04G 21/00* (2013.01); *G04B 19/223* (2013.01); *G06F 3/0362* (2013.01); *G08B 25/006* (2013.01); *H04L 63/083* (2013.01); *H04L 63/107* (2013.01); *H04L 67/12* (2013.01); *H04W 4/80* (2018.02); *H04W 12/02* (2013.01); *H04W 12/06* (2013.01); *H04W 12/08* (2013.01); *H04L 63/20* (2013.01)

(58) Field of Classification Search
CPC .................................................... G08B 25/006
USPC ............................................................ 340/517
See application file for complete search history.

(56) References Cited

U.S. PATENT DOCUMENTS

| | | |
|---|---|---|
| 5,517,429 A | 5/1996 | Harrison |
| 5,576,972 A | 11/1996 | Harrison |
| 6,166,633 A | 12/2000 | Wang |
| 7,323,978 B2 | 1/2008 | Parker et al. |

(Continued)

OTHER PUBLICATIONS

Van Putten, Bart-Jan, "How to design a monitoring system for seniors," Seniorwise, Sep. 18, 2015, pp. 1-19.

*Primary Examiner* — Ojiako Nwugo
(74) *Attorney, Agent, or Firm* — Innovation Counsel LLP

(57) ABSTRACT

According to an embodiment of the present disclosure, a security hub provides smart security notifications based on determined urgency levels. The hub comprises a communications interface and a computer processor operatively connected to the communications interface. The communications interface is configured to receive detection information from a plurality of sensors. The computer processor is configured to analyze the detection information, compare the detection information with past detection information, determine an urgency level on the basis of the analysis and comparison, and perform an action corresponding to the determined urgency level.

21 Claims, 4 Drawing Sheets

(56) References Cited

U.S. PATENT DOCUMENTS

| | | |
|---|---|---|
| 7,893,960 B1 | 2/2011 | Wallach |
| 8,704,668 B1 | 4/2014 | Darrell et al. |
| 8,779,919 B1 | 7/2014 | Darling et al. |
| 9,183,712 B2 | 11/2015 | Witmer et al. |
| 9,344,330 B2 | 5/2016 | Jacob et al. |
| 2004/0260408 A1* | 12/2004 | Scott .................. G05B 23/0213 700/20 |
| 2006/0232673 A1 | 10/2006 | Lipton et al. |
| 2012/0310376 A1* | 12/2012 | Krumm .................. G05B 15/02 700/31 |
| 2012/0313785 A1* | 12/2012 | Hanson .................. G08B 21/24 340/573.1 |
| 2015/0102924 A1* | 4/2015 | Soloway .............. G08B 25/008 340/539.11 |

\* cited by examiner

INTELLIGENT SECURITY HUB FOR PROVIDING SMART ALERTS

CROSS-REFERENCE TO RELATED APPLICATIONS

This application claims priority to and the benefit of U.S. Provisional Patent Application No. 62/327,795, titled "SYSTEM AND METHOD FOR PROVIDING A SECURITY HUB" and filed on Apr. 26, 2016, the entire content which is incorporated herein by reference

RELATED FIELD

The present disclosure relates to a system and method of providing smart alerts.

BACKGROUND

Traditional security systems generally provide security alerts to its user(s) when one or more of its sensors are tripped. For example, in the case of a security camera, an administrator may set a motion detection threshold and set a motion detection area in the security camera's field of view, and whenever motion exceeding the detection threshold is detected in the detection area, the security camera may send an alert to its user(s), for example, via an Email or a push notification to one or more electronic devices associated with the user(s). However, this means the security camera may be tripped many times a day by various movements that are not actual security threats, such as movements of a pet or the shadows of swaying branches coming through the window. After a while, the user(s) may be inundated by the numerous alerts and become desensitized to what could be actual security threats. Thus, in view of the foregoing, there exists a need for the presently disclosed system and method of providing smart security alerts.

SUMMARY

According to an embodiment of the present disclosure, a security hub provides smart security notifications based on determined urgency levels. The hub comprises a communications interface and a computer processor operatively connected to the communications interface. The communications interface is configured to receive detection information from a plurality of sensors. The computer processor is configured to analyze the detection information, compare the detection information with past detection information, determine an urgency level on the basis of the analysis and comparison, and perform an action corresponding to the determined urgency level.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
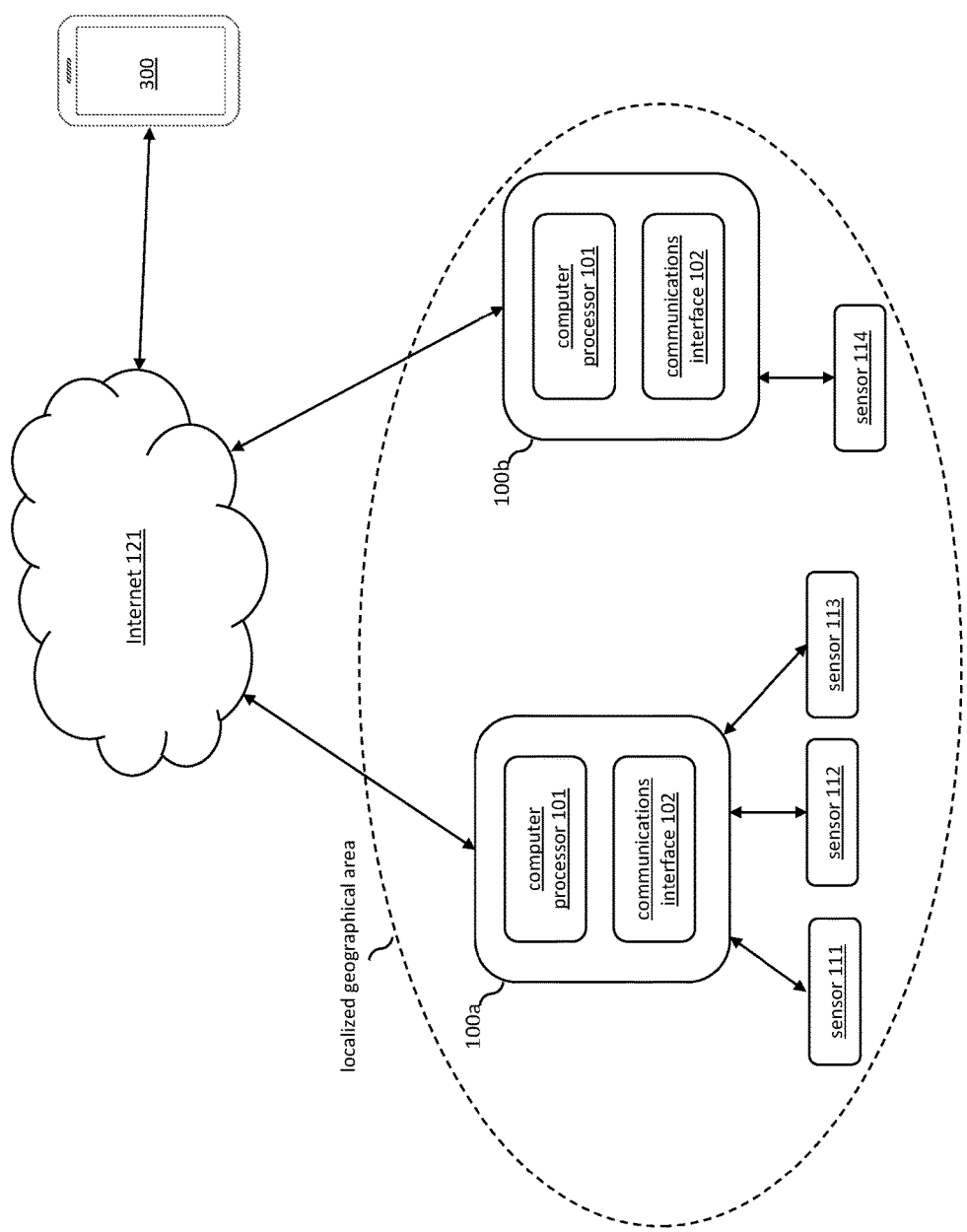
FIG. 1 is a block diagram depicting an implementation of an intelligent security hub for providing smart alerts to its users, according to an example embodiment of the disclosure.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As discussed earlier, traditional security systems often inundate users with security alerts of detection events that are not actual security threats. As a result, the users become desensitized to the security alerts and fail to act accordingly, such as activating an alarm and/or notifying the police department, when an actual security threat occurs. Embodiments of the present disclosure overcome the drawbacks of the traditional security systems and reduce the chances of triggering a false alarm by providing smart security alerts to its users according to urgency levels determined based on user feedback and past detection information. That is, a security hub according to an example embodiment of the present disclosure may use user feedback to verify detection events and urgency level, which helps the security hub to learn and improve the accuracy of its security alerts.

FIG. 1 is a block diagram depicting an implementation of an intelligent security hub for providing smart alerts to its users, according to an example embodiment of the disclosure. A security hub 100a includes a computer processor 101 and a communications interface 102 (although only two components of the security hub are shown, the security hub of the present disclosure are not limited thereto). The communications interface 102 is configured to communicate with a plurality of sensors 111, 112, and 113 to receive detection information therefrom. The sensors, for example, may be different types of sensors, such as security camera, a microphone, a contact sensor, etc. Also, the number of sensors is not limited to those shown in FIG. 1.

According to one embodiment, the communications interface 102 is configured to receive a sequence of detection information from the plurality of sensors 111, 112, and 113. The computer processor 101 of the security hub 100a may determine a desired sequence of detection information that occurs before triggering an urgency level. If there are two detected events from two of the sensors 111, 112, and 113, the computer processor 101 determines that there is a desired sequence of detection information based on the first detected event and the second detected event occurring within a specified threshold time.

For example, consider the case in which the security hub 100a is installed within a home that has a dog. If the dog barks when a burglar approaches the home, one of the sensors 111, 112, and 113 (e.g., a microphone) may detect sound first before another sensor (e.g., a contact sensor) detects an opening of a window/door by the burglar. Furthermore, the computer processor 101 may differentiate between a first sound type (e.g., those caused by the home owner) and a second sound type (e.g., those caused by the burglar). If the computer processor 101 detects the first sound type followed by the opening of the contact sensor, the security hub 100a does not have to determine an urgency level. If the computer processor 101 detects the second sound type followed by the opening of the contact sensor, the security hub 100a determines an urgency level.

The communications interface 102 of the security hub 100a is also configured to communicate with a user electronic device 300 (e.g., mobile phone) via a communications network, such as the Internet 121. The security 100a may send security alerts to the user electronic device 300, which may include a request for user feedback, and also receive user feedback therefrom.

The communications interface 102 of the security hub 100a is also configured to receive current event information from various external sources that are a part of or connected to the communications network, i.e., the Internet 121 in this case. For example, the security hub 100a may receive real-time detection information from another security hub 100b that is connected to the Internet 121 and physically located in the same localized geographical area where the security hub 100a is located (e.g., in the same neighborhood or general radial vicinity). As another example, the security hub 100a may also receive police alerts regarding recent or on-going criminal events that have occurred or are occurring in or nearby the localized geographical area. This enables the security hub 100a to utilize the received current event information to further assess and determine the urgency level of its own detection events, as described in further detail below.

Figure 2:
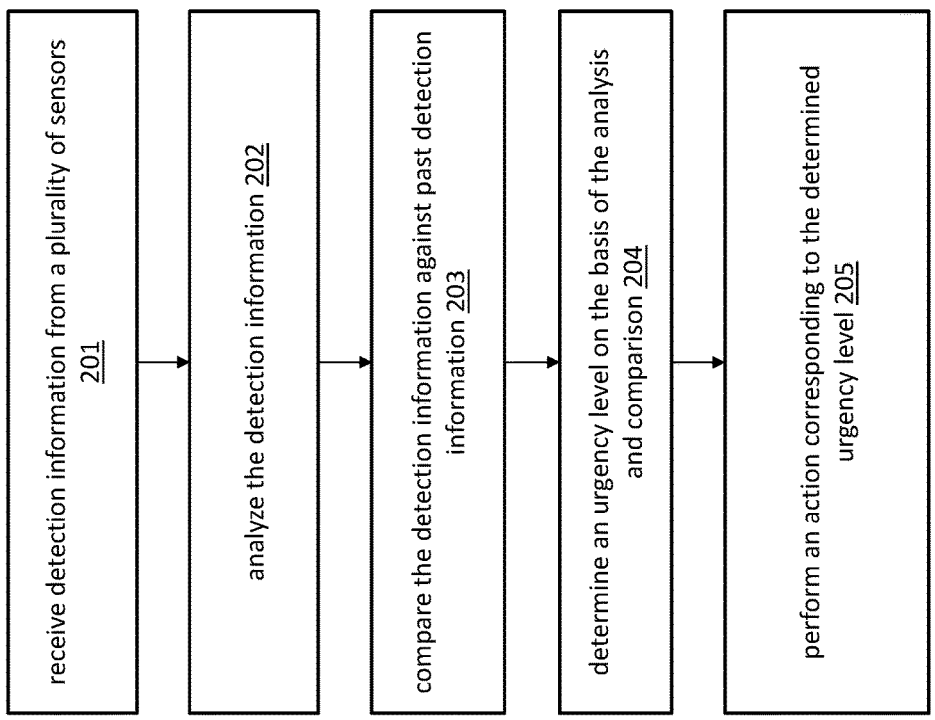
FIG. 2 shows a flowchart of high-level operations of an intelligent security hub for providing smart alerts to its users, according to an example embodiment of the present disclosure.

FIG. 2 illustrates a flowchart of high-level operations of an intelligent security hub for providing smart alerts to its users, according to an example embodiment of the present disclosure. Although one or more components of the security hub are described below as performing the disclosed operations, the present system and method are not limited thereto, and other components of the security hub may perform those operations instead or in conjunction.

The communications interface of the security hub receives detection information from a plurality of sensors (at 201). The computer processor of the security hub analyzes the detection information (at 202). Analyzing the received detection information may include calculating a probability of occurrence of an event type on the basis of the detection information. For example, when a dog knocks over a vase, a security camera may detect the motion of the dog and the breaking vase, and a microphone may further detect the sound of the breaking vase. By performing a visual analysis and an audio analysis of the detection information received from the security camera and the microphone, the security hub may calculate a probability that the event type corresponds to that of a breaking vase. Furthermore, the computer processor may assign a weight value to detection information received from each of the sensors and then apply the weight values to calculate the probability of occurrence of the event type. According to one embodiment, the computer processor may further create a location map indicating where the sensors are installed. The computer processor may compare the probabilities of past events detected by sensors at different locations and provide a higher weight value to the sensors at particular locations that have a higher probability for detecting certain past events (e.g., a break-in at a window/door) based on past detection information.

The computer processor compares the detection information against past detection information (at 203). For example, the security hub may detect movements of the dog and compare the detection information against past detection information to determine whether the new movements are similar to those detected in the past. As another example, the computer processor may compare a location (e.g., where in the field of view of the security camera) or temperature associated with the detection information against the past detection information.

On the basis of the analysis performed at 202 and the comparison performed at 203, the computer processor determines an urgency level (at 204). The determined urgency level may be one of a low level, a moderate level, and a high level in that order of urgency but is not limited thereto. For example, the computer processor may determine the urgency level to be at the high level in response to detection information including an image of a human face. The computer processor then performs an action corresponding to the determined urgency level (at 205).

According to an example embodiment, if the determined urgency level is the low level or the moderate level, the security hub may send a notification to a user device, and the notification may include information pertaining to the event type and a request for user feedback. For example, the notification may be sent to the user as a push notification to an application running on the user electronic device and may include an image captured by a security camera.

The communications interface may receive user feedback from the user device, and the computer processor may update the past detection information according to the user feedback and the detection information. For example, going back to the scenario in which the dog's movements are detected, if the user feedback confirms that the detection information corresponds to the dog's movements, the computer processor may update a detection pattern included in the past detection information such that the dog's future movements will be detected with a higher probability. The computer processor may also raise the determined urgency level to a higher level in response to the user feedback indicating a security threat or maintain the determined urgency level at its current level in response to the user feedback indicating no security threat.

The communications interface may receive and analyze current event information from a source external to the security hub, such as an Internet news source or an online police bulletin. The current event information may include alerts of recent criminal events in a localized geographical area encompassing the current location of the security hub, which may be determined by the computer processor, for example, using Wi-Fi positioning technology. As discussed earlier, security hub may receive current event information from other security hubs located within the same, localized geographical area. In this way, a cluster of security hubs may function as a neighborhood watch system.

The computer processor may assign a weight value to detection information received from each of the sensors on the basis of at least the received current event information. The computer processor may also determine the urgency level on the basis of the received current event information. For example, if the current event information indicates that there has been a recent increase in burglary break-ins through windows, the computer processor may assign a higher weight value to the detection information received from contact sensors placed at the windows. Also, the computer processor may determine the urgency level to be at a higher level when the detection information from the contact sensors indicates that one or more windows are open.

According to an example embodiment, the present system includes a security hub that is connected to a plurality of sensors including a security camera, a motion sensor, and a microphone. The security hub collects detection information from the plurality of sensors and determines a desired action. The security hub assesses and determines an urgency level on the basis of the detection provided by the security camera, the contact sensor, and the microphone. The security hub may further provide a desired type of action for a corresponding urgency level. For example, the urgency levels may be a low level, a moderate level, and a high level but are not limited thereto.

Figure 3:
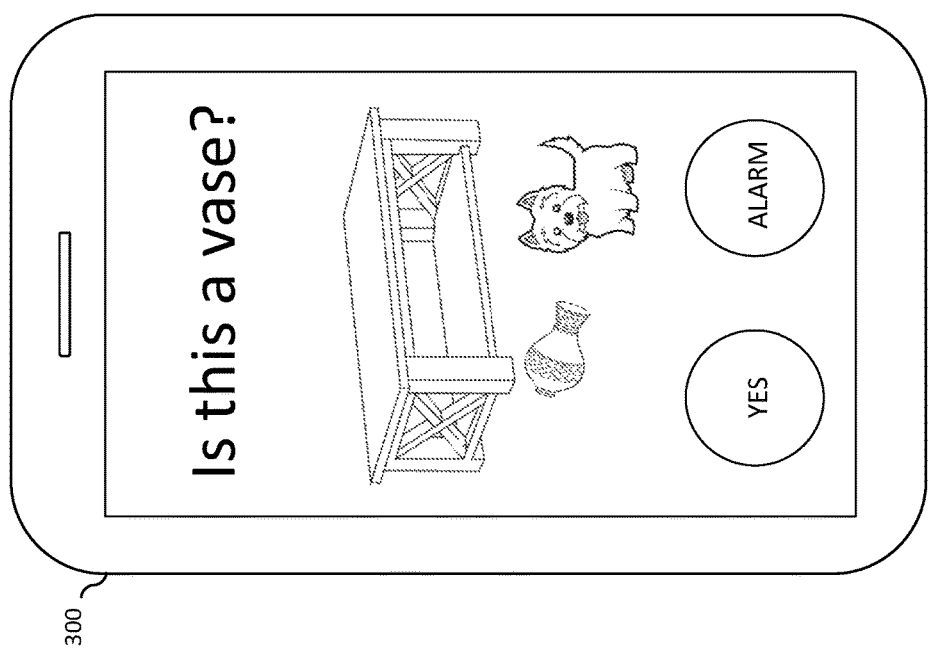
FIG. 3 shows an example of an security alert requesting feedback from a user, according to an example embodiment of the present disclosure.

If the security hub receives only detection information from the security camera and the microphone but not the contact sensor, the security hub may determine the urgency level to be at the moderate level. For example, when the dog knocks over a vase, the security camera detects the motion of the dog and the breaking vase, and the microphone further detects the sound of the breaking vase. However, the contact sensor does not detect an opening of a window. In such case, because the security hub received only motion detection information from the security camera and audio detection information from the microphone, the security hub may determine that the urgency level is at the moderate level. Based on the determined urgency level, the security hub may send a notification to the user via an application on the user's electronic device. The notification, such as shown in FIG. 3, may include an image captured from the security camera and prompt the user to verify whether the detected event is the breaking of a vase. The user interface of the notification may further prompt the user to select an alarm status. For example, the user may confirm the event type and dismiss the notification by pressing the "YES" button or trigger an alarm by pressing the "ALARM" button. Thus, instead of directly triggering an alarm, the present system allows the user to assess the situation before triggering an alarm.

If the security hub receives motion detection information from the security camera, audio detection information from the microphone, and further an indication from the contact sensor that the window has been opened, the security hub may determine the urgency level to be at the high level, and may immediately trigger an alarm, as that may indicate that someone has broken into the home. Thus, since the security hub according to embodiments of the present disclosure provides various types of actions for corresponding urgency levels on the basis of the combined data provided by the plurality of sensors connected to the security hub, the chances of triggering a false alarm are reduced.

Figure 4:
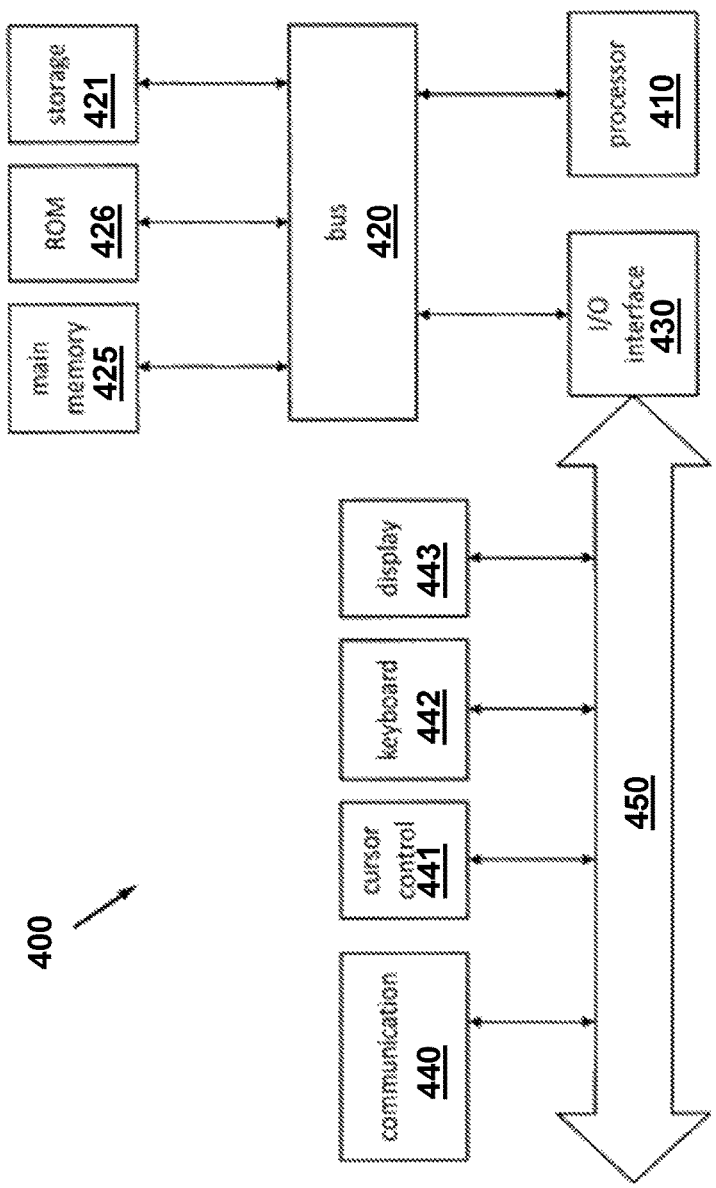
FIG. 4 illustrates an example computer architecture that may be used to implement embodiments of the present disclosure, for example, the security hub.

FIG. 4 illustrates an example computer architecture that may be used to implement embodiments of the present system and method. The example computer architecture may be used for implementing one or more components described in the present disclosure including, but not limited to, the security hub. One embodiment of architecture 400 comprises a system bus 420 for communicating information, and a processor 410 coupled to bus 420 for processing information. Architecture 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Architecture 400 may also include a read only memory (ROM) and/or other static storage device 426 coupled to bus 420 for storing static information and instructions used by processor 410.

A data storage device 421 such as a magnetic disk or optical disc and its corresponding drive may also be coupled to architecture 400 for storing information and instructions. Architecture 400 can also be coupled to a second I/O bus 450 via an I/O interface 430. A plurality of I/O devices may be coupled to I/O bus 450, including a display device 443, an input device (e.g., an alphanumeric input device 442, a cursor control device 441, and/or a touchscreen device).

The communication device 440 allows for access to other computers (e.g., servers or clients) via a network. The communication device 440 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A security hub providing smart security notifications based on determined urgency levels, the hub comprising:
    a communications interface configured to receive detection information from a plurality of sensors; and
    a computer processor operatively connected to the communications interface and configured to:
        analyze the detection information,
        compare the detection information against past detection information,
        determine an urgency level on the basis of the analysis and comparison, and
        perform an action corresponding to the determined urgency level.

2. The security hub of claim 1, wherein to analyze the received detection information includes calculating a probability of occurrence of an event type on the basis of the detection information.

3. The security hub of claim 1, wherein the determined urgency level is among a low level, a moderate level, and a high level in that order of urgency.

4. The security hub of claim 3, wherein:
    the determined urgency level is the low level or the moderate level, and
    the action corresponding to the determined urgency level is to send a notification to a user device, the notification including information pertaining to the event type and a request for user feedback.

5. The security hub of claim 4, wherein the communications interface is configured to receive user feedback from the user device, and
    the computer processor is configured to update the past detection information according to the user feedback and the detection information.

6. The security hub of claim 5, wherein the computer processor is configured to raise the determined urgency level to the high level in response to the user feedback indicating a security threat.

7. The security hub of claim 6, wherein the computer processor is configured to maintain the determined urgency level at its current level in response to the user feedback indicating no security threat.

8. The security hub of claim 1, wherein to compare the detection information against past detection information includes comparing at least one of a location and a temperature associated with the detection information.

9. The security hub of claim 2, wherein calculating a probability of occurrence of an event type on the basis of the detection information includes:
    assigning weight values to detection information received from the one or more sensors, and
    applying the weight values to calculate the probability of occurrence of the event type.

10. The security hub of claim 9, wherein the communications interface is configured to receive and analyze current event information from an external source.

11. The security hub of claim 10, wherein the computer processor is configured to assign the weight values on the basis of the received current event information.

12. The security hub of claim 10, wherein the computer processor is configured to determine the urgency level on the basis of the received current event information.

13. The security hub of claim 10, wherein the computer processor is configured to determine the current location of the security hub.

14. The security hub of claim 13, wherein the current event information includes alerts of recent criminal events in a localized geographical area encompassing the current location of the security hub.

15. The security hub of claim 13, wherein the communications interface is configured to communicate with other security hubs within a localized geographical area encompassing the current location of the security hub, and an external source is another security hub.

16. The security hub of claim 10, wherein the external source is an Internet news source.

17. The security hub of claim 3, wherein the computer processor is configured to determine the urgency level to be at the high level in response to detection information including an image of a human face.

18. The security hub of claim 9, wherein the plurality of sensors includes a contact sensor, a security camera, and a microphone.

19. The security hub of claim 18, wherein the computer processor is configured to determine the urgency level to be at the moderate level in response to receiving detection information from the security camera or the microphone but not from the contact sensor.

20. The security hub of claim 1, wherein to analyze the received detection information includes determining whether the detection information follows a desired sequence of detection from the plurality of sensors.

21. The security hub of claim 9, wherein the computer processor determines the weight values based on comparing probabilities of occurrence of past events detected by the sensors at different locations.

* * * * *